Sept. 28, 1926.  H. G. CARLSON  1,601,016
METHOD OF MAKING PRESSERS FOR FLIERS
Filed July 25, 1924  4 Sheets-Sheet 1
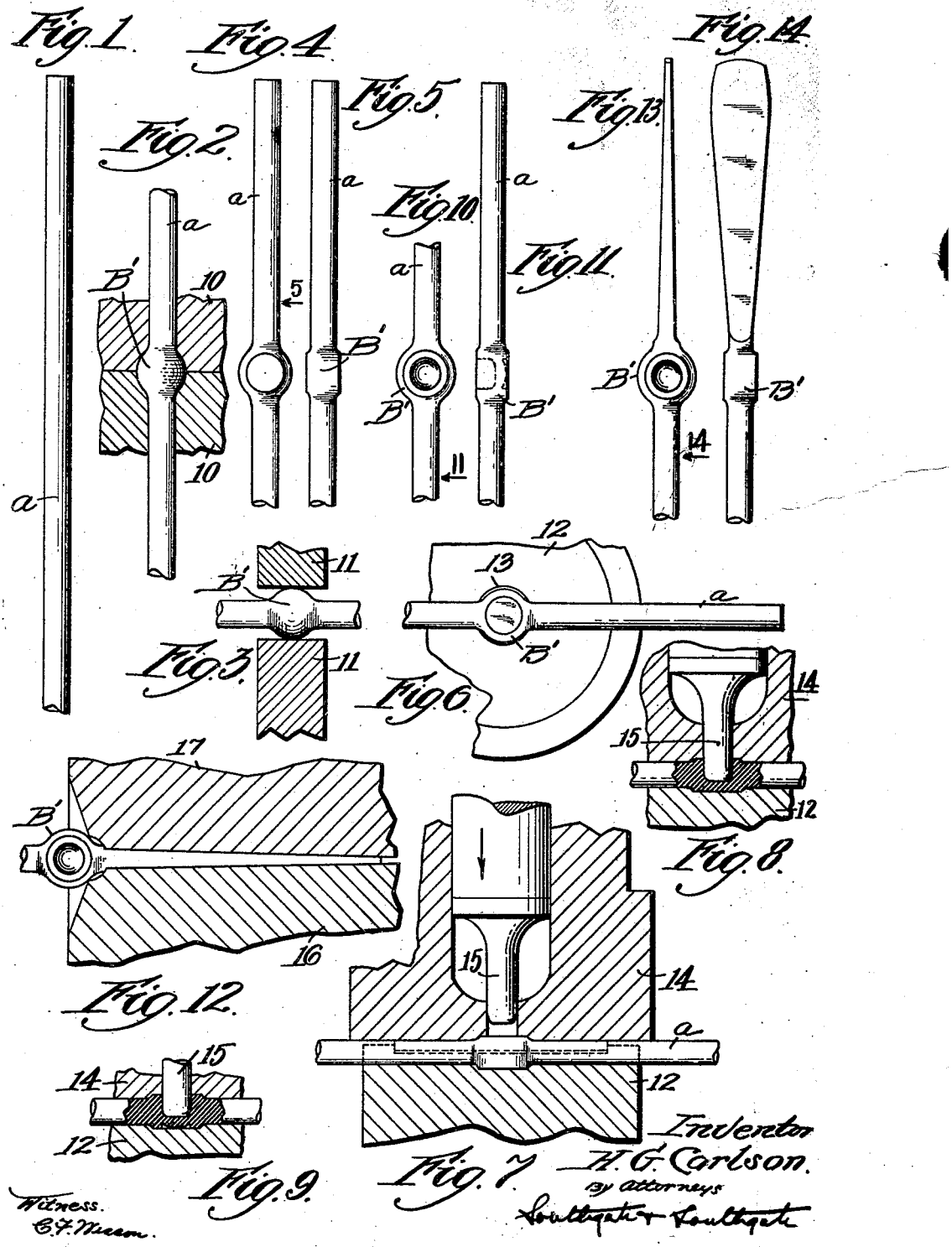

Sept. 28, 1926.
H. G. CARLSON
1,601,016
METHOD OF MAKING PRESSERS FOR FLIERS
Filed July 25, 1924 4 Sheets-Sheet 2
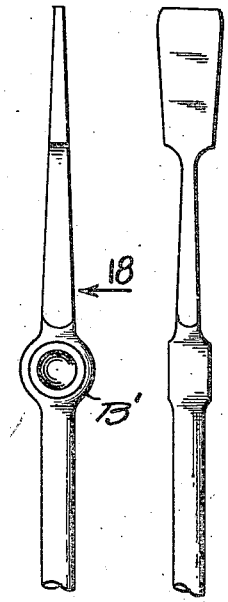
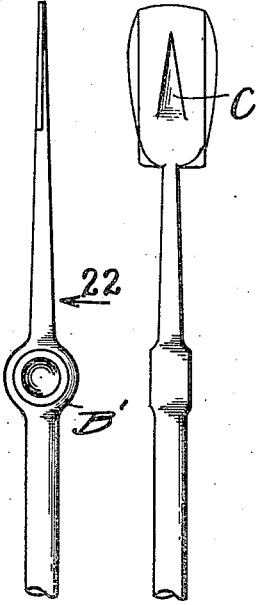
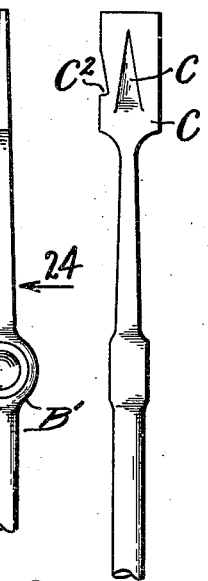
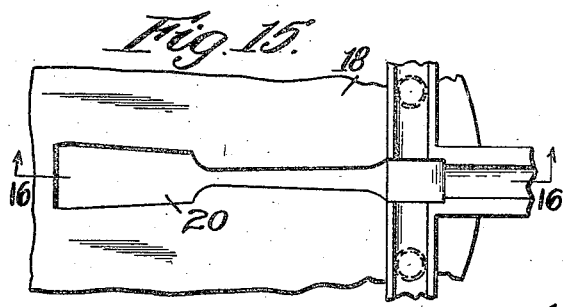
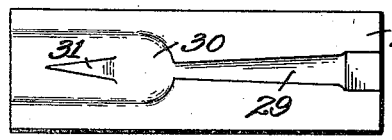
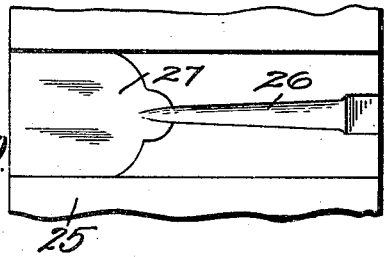
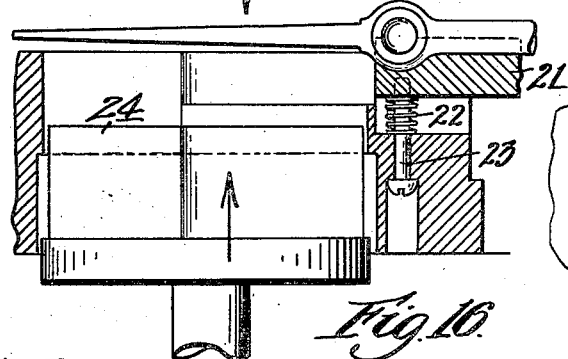
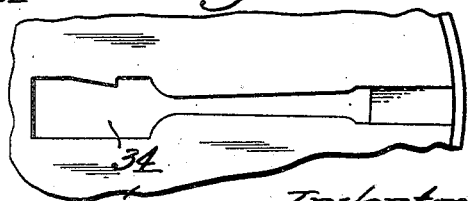

Sept. 28, 1926.
H. G. CARLSON
METHOD OF MAKING PRESSERS FOR FLIERS
Filed July 25, 1924   4 Sheets-Sheet 3
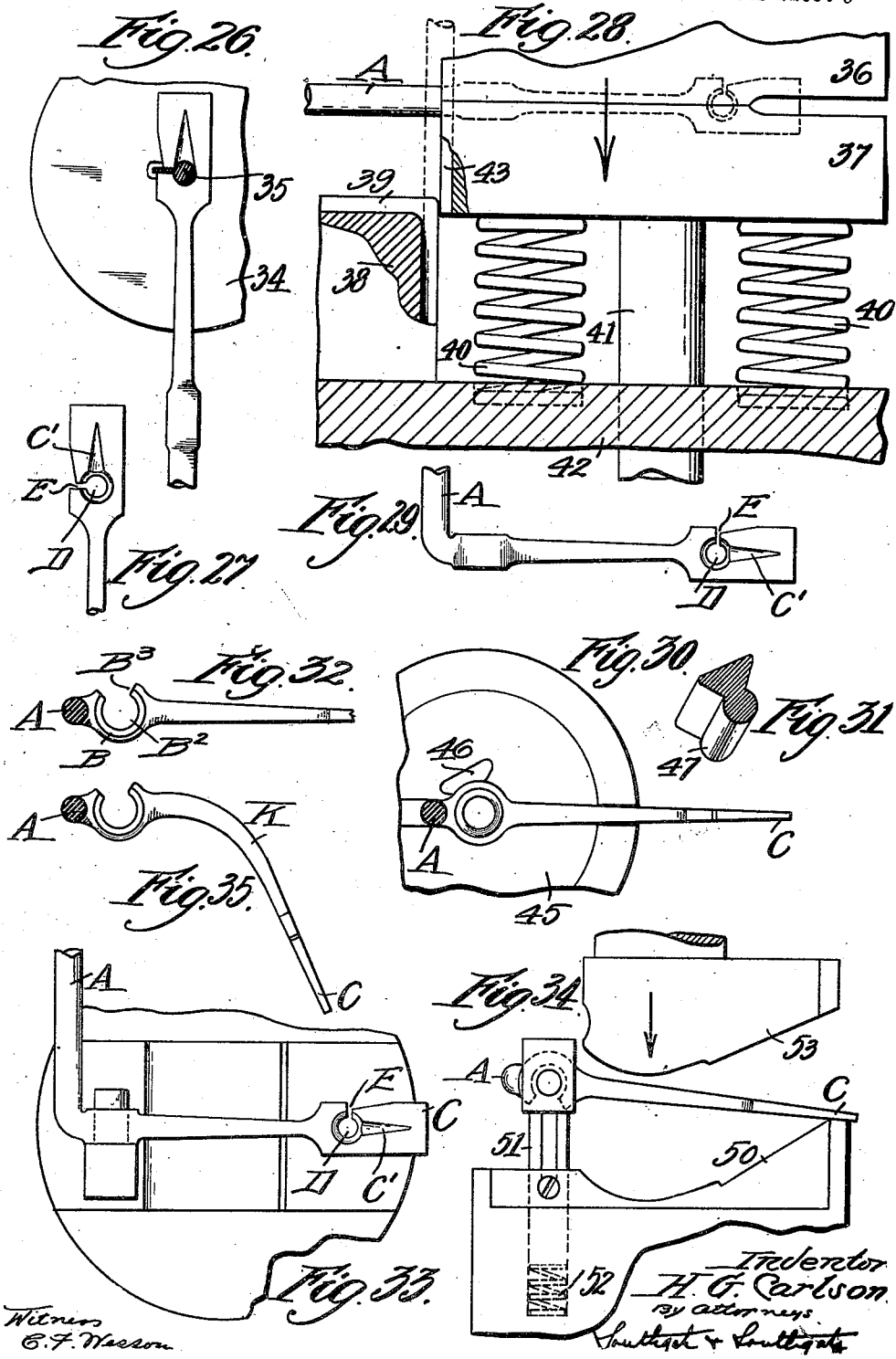

Sept. 28, 1926.
H. G. CARLSON
1,601,016
METHOD OF MAKING PRESSERS FOR FLIERS
Filed July 25, 1924 4 Sheets-Sheet 4
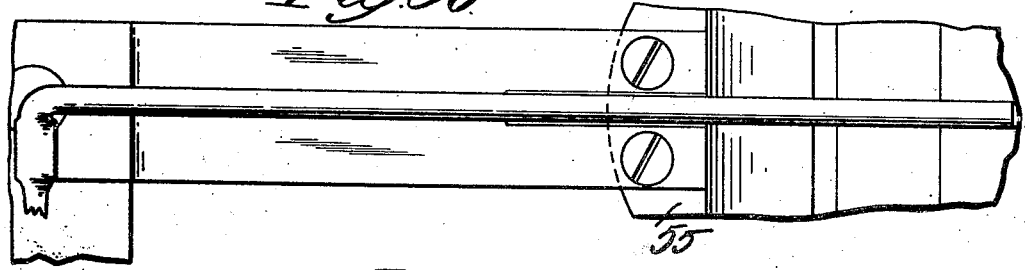
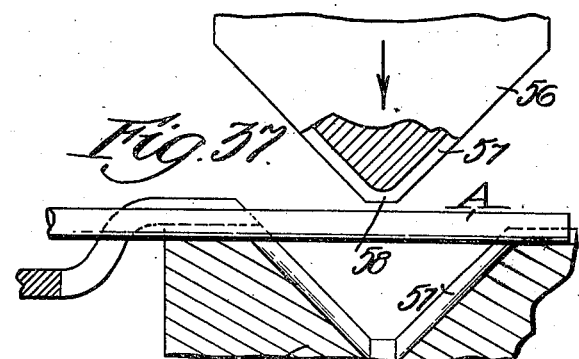
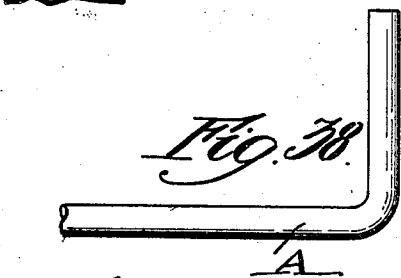
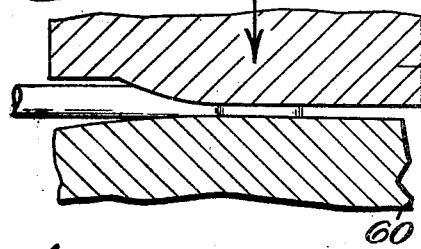
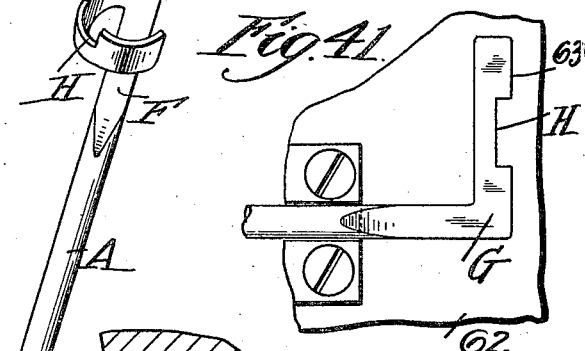
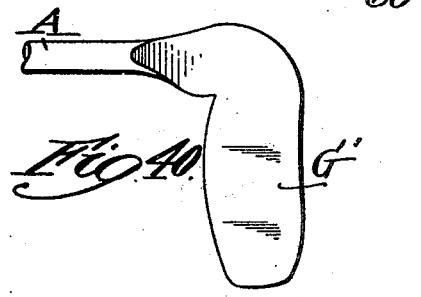
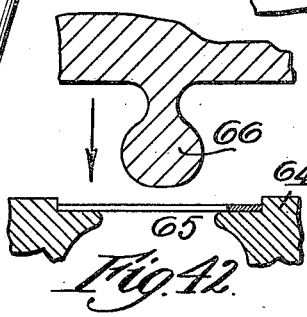
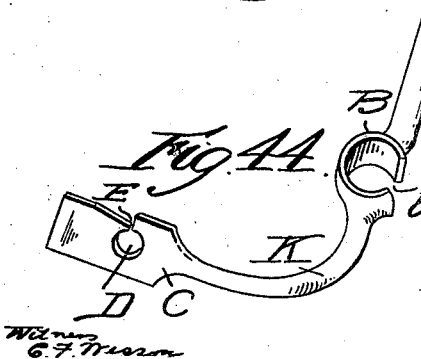

Patented Sept. 28, 1926.

1,601,016

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

METHOD OF MAKING PRESSERS FOR FLIERS.

Application filed July 25, 1924. Serial No. 728,272.

This invention relates to the method of forming a presser such as is ordinarily used on fliers operating on a spinning frame starting with a rod of metal and forming the article in a single piece by a series of metal working operations.

The principal objects of the invention are to provide for forming the completed article from a single piece of metal originally of the form of a round rod or bar with a minimum number of operations and tools; to carry out the operations in such a manner that each one will change the shape and size of the blank as much as is practical and yet not enough to render the result of the operation doubtful, thus insuring that the products will be uniform, and especially to provide a method of operation which will permit of quantity production at a comparatively small expense.

Reference is to be had to the accompanying drawings, in which

Fig. 1 is a side view of a part of a round wire or rod constituting the original blank from which the presser is to be formed;

Fig. 2 is a sectional view of a pair of upsetting dies showing this blank in position therein with their operation performed thereon to form an enlargement for making the lower bearing;

Fig. 3 is a view of the same blank showing the next operation;

Fig. 4 is a side view;

Fig. 5 is an edge view of the blank as it is left after the operation shown in Fig. 3;

Fig. 6 is a plan of the bottom die of a pair in which the next operation is performed showing the blank in position;

Fig. 7 is a sectional view of the same along the center of the blank showing the punch making a depression in the blank;

Fig. 8 is a similar view showing the action of the punch and illustrating its final position;

Fig. 9 is a similar view showing the effect produced by reversing the blank and punching it further on the opposite side in a position in alignment with the depression formed in Fig. 8;

Figs. 10 and 11 are respectively a side and edge view of the blank as it comes out of the dies shown in Fig. 9;

Fig. 12 is a sectional view of a pair of dies for flattening and squeezing out the thread eye end of the blank on one side of the enlargement and showing the blank in place therein;

Figs. 13 and 14 are respectively a side and edge view of the blank as it comes from the dies shown in Fig. 12;

Fig. 15 is a plan of the lower one of a pair of trimming dies for trimming the part of the blank shown in Figs. 13 and 14;

Fig. 16 is a side view of this set of dies partly in section with the blank in position;

Figs. 17 and 18 are respectively a side and edge view of the blank as trimmed in the dies shown in Figs. 15 and 16;

Fig. 19 is a plan of a bottom die of a pair for performing the next operation;

Fig. 20 is a bottom plan view of the top die of the same pair;

Figs. 21 and 22 are respectively a side and edge view of the blank as shaped by the dies shown in Figs. 19 and 20;

Fig. 23 is a view similar to Fig. 15 of another trimming die operated in the same way;

Figs. 24 and 25 are respectively a side and edge view of the blank as trimmed by the die shown in Fig. 23;

Fig. 26 is a plan of a die for use in punching a hole in this end of the blank;

Fig. 27 is a view of the eye end or foot of the blank completed as it comes from the die shown in Fig. 26;

Fig. 28 is a side view partly in section of a set of bending dies;

Fig. 29 is an edge view of the same end of the blank as it comes from said bending dies;

Fig. 30 is a plan similar to Fig. 6 of a lower die to cooperate with a punch for completing the lower bearing;

Fig. 31 is a perspective view of part of said punch;

Fig. 32 is an edge view of the eye end of the presser as it comes from the dies shown in Figs. 30 and 31;

Fig. 33 is a plan of the lower one of a pair of bending dies;

Fig. 34 is a side view of said bending dies showing the blank in its initial position therein;

Fig. 35 is a view similar to Fig. 32 showing the result of the operation of said bending dies;

Fig. 36 is a plan of the lower one of a pair of bending dies for operation on the other end of the blank;

Fig. 37 is a side view partly in section of this set of bending dies with the blank in its initial position therein;

Fig. 38 is a view of the end of the blank showing the result of the operation of these bending dies;

Fig. 39 is a transverse sectional view of a pair of dies for flattening and squeezing out the part of the blank shown in Fig. 38;

Fig. 40 is a view similar to Fig. 38 showing the result of this operation;

Fig. 41 is a plan of a lower trimming die for receiving the blank shown in Fig. 40;

Fig. 42 is a sectional view of a pair of bending dies adapted to operate on the blank as trimmed in Fig. 41;

Fig. 43 is a sectional view of the transverse end of the blank as bent up by the dies shown in Fig. 42; and Fig. 44 is a perspective view of the completed article.

The product of this process is a complete presser as shown in Fig. 44. There is no intention to materially modify the article as now on the market. It comprises a rod or shank A of the same size as the blank $a$ shown in Fig. 1 from which it is made. In use this shank A is located vertically on one arm of a flier and is provided at the bottom with a split ring B adapted to be received on the arm of the flier, constituting a lower bearing. Ring B is cut out at $b$ to permit it to be located in place easily. From this ring extends an arm K at right angles to the shank A having on it the presser foot G consisting of a flat piece of metal of the shape shown. This is provided with an eye D and a slot E through its edge to receive the thread or yarn. At the other end the rod A is flattened out to provide a thin part F which at its extreme end is turned at right angles and provided with a nearly cylindrical wall G adapted to be received on the upper end of the arm of the flier and constituting the upper bearing. The wall G has a notch cut out at H to enable it to be received between the lugs on the flier and prevent its being displaced longitudinally.

The process commences by clamping the rod A in a pair of upsetting dies 10, as shown in Fig. 2, and upsetting a globular enlargement B' thereon at a short distance from one end. The next operation is shown in Fig. 3. The globular enlargement is flattened on both sides by a pair of dies 11 having plain surfaces so as to assume the shape shown in Figs. 4 and 5 with opposite parallel flat sides.

Now the blank just described is placed in a die 12 having a depression 13 a little larger than the enlargement B' and a die 14 similarly shaped is brought down upon to shape the enlargement B' and give it a substantially cylindrical outer surface and flatten it a little more. This die 14 carries a punch 15 which is brought down more than half way through the stock as shown in Fig. 8 to punch a depression in it and thereby force metal into the dies 12 and 14.

For the purpose of providing two opposite depressions in this and ensuring their accurate alinement and also providing a wall between them adapted to be punched through later, I reverse the blank thus provided and place it back in the die 12 and then bring the die 14 and punch 15 down as shown in Fig. 9. This displaces the metal further, forms a central wall and leaves a depression in the back. If desired the die shown in Fig. 9 may be of a different set from that shown in Fig. 8 having a little larger surface to receive the excess metal. This leaves the blank in the form shown in Figs. 10 and 11.

Next the short end of the blank is placed between a pair of dies 16 and 17 and pressure applied to squeeze the metal and flatten out the blank to a tapered shape on that end with the result shown in Figs. 13 and 14. This flattened end is then placed in a trimming die 18 and trimmed by forcing it down through it by means of a punch 19 of the desired shape as shown by the opening 20 in Fig. 15. The blank at this time rests on a plate 21 held up by springs 22 and guided by rods 23. When the blank is punched out through the opening 20 it is received by an ejector 24 and forced out of the dies. At this stage this end of the blank has the shape shown in Figs. 17 and 18.

The blank, having been trimmed off in this manner, is placed on a die 25 which has a tapering groove 26 therein and an enlarged flattened space 27. On the blank, located in this die, is placed a top die 28 which has a tapering groove 29 like the groove 26 or complimentary to it and another space 30 having a tapered projection 31. The blank being pressed between these dies assumes the shape shown in Figs. 21 and 22. It will be seen that a tapering thread guiding groove C' is formed on one side of the blank as shown in Figs. 21 and 22. Now this blank is put into a trimming die 33 having an opening 34 of the desired shape but otherwise operating like the die 18. A punch is brought down upon it and the blank trimmed to the form shown in Figs. 24 and 25 by cutting around its edges. It will be seen that the tapering groove C' is not altered and that the foot C of the blank is given a rectangular shape with an angular notch $C^2$ in the edge.

Now the end of the blank is put into a bottom die 34 and a punch 35 brought down through a slot of the same shape to cut out a circular eye opening D in the blank as shown in Fig. 27 and providing a thread slot E through its side into the notch C'.

The next operation is to put the blank into a pair of dies 36 and 37 which cooperate with a die 38 having a vertical semicylindrical groove 39 along the edge and bring the dies 36 and 37 down past the die 38. The dies 36 and 37 have semi-circular end grooves 43 so that the rod will be bent at right angles as shown in Fig. 29. No other modification is made at this operation. The dies 36 and 37 are supported on springs 40 and with a guide rod 41 on a base 42.

The next operation is to place the bent blank thus formed in a lower die 45 which has a groove to hold it properly in place and has an opening 46 all the way through it. Then a plunger or punch 47 fitting in the opening 46 and having a partly cylindrical portion projecting therefrom is brought down and forced through the blank to punch out the wall as shown in Fig. 32. This forms an interior hole B² in the hub B of the blank and also cuts out a segment B³ at one side of the circle of this hub to form an open passage b. This completes the bottom bearing.

Next the blank just referred to is placed on a lower bending die 50 as shown in Figs. 33 and 34. It is held above this die on a plunger 51 supported by a spring 52. Then the upper bending die 53 is brought down. These two dies are shaped to bend the blank shown in Fig. 32 into the form shown in Fig. 35. This completes the formation of this end of the blank and it leaves it in the finished form shown at the bottom of Fig. 44.

The other end of the blank is now placed in the bending die 55 in the position shown in Figs. 36 and 37 and the upper bending die 56 brought down upon it. These dies each have two semi-cylindrical grooves 57 complimentary to each other and at right angles to each other and separated by a short curved portion 58. They result in bending the shank A, at right angles into the position shown in Fig. 38. This bent end of the rod is then placed between two dies 60 and 61 which have flat surfaces to bend it out into the form shown in Fig. 40, giving a flat wide body G' at right angles to the shank A and considerably thinner. This end of the blank is then placed in a trimming die 62, cut out to the desired shape as shown by the opening 63 and trimmed off in the same manner as described in connection with Fig. 15 to produce the desired shape. This provides the arm G and the notch H shown in the completed article in Fig. 44, but it is in a flat condition.

To bend it up into the circular shape desired it is placed on a supporting die 64 having an opening 65 therein and a die 66 having a nearly circular horizontal projection to drop down through the opening and bend this end of the blank into the form shown in Fig. 43. This constitutes the upper bearing and leaves the presser as shown in Fig. 44 with all its parts complete ready to be applied to the flier.

By constructing the article in this manner, entirely by dies, it will be seen that it is suitable for quantity production and the product will be uniform and does not need the hand finishing and other operations heretofore necessary. Pressers made by this process are all uniform as they come out of the last dies and can be used as they are produced, with the exception of ordinary smoothing operations such as can be performed economically in quantity.

As pressers are used in vast quantities on spinning frames my process affords great economy in the cast of an essential element thereof.

Although I have illustrated and described only one way of carrying out the process and one type of product, I am aware of the fact that the invention can be carried out with modifications and that it could be applied to the manufacture of articles of this general nature but having a different shape without departing from the scope of the invention as expressed in the claims. Therefore, I do not wish to be limited in these respects, but what I do claim is:—

1. The method of making the lower bearing of a presser for a flier, which comprises upsetting a rod of the size of the shank of the flier to form a substantially globular enlargement thereon intermediate of its ends, flattening the said enlargement at two diametrically opposite points, forming through one of the flattened surfaces a depression by a punching operation, then forming a depression in the opposite flattened surface and forcing the wall of metal between the two backwardly to a point near the opposite side, and finally punching out the web of metal between the two depressions and at the same time cutting through the side wall of the enlargement to provide an open-sided circular bearing hub.

2. The method of making the lower bearing of a presser for a flier, which comprises upsetting a rod to form an enlargement, forming a depression in one side of the enlargement by a punching operation, then forming a depression in the opposite side and forcing the wall of metal between the two backwardly, and finally punching out the web of metal between the two depressions and at the same time and by the same operation cutting through the side wall of the enlargement to provide an open-sided circular bearing hub.

3. The method of making a presser for a flier, which consists in providing a rod of uniform diameter, upsetting it at a point between its ends to form a globular enlargement, flattening the opposite sides of the enlargement, punching into said opposite sides to form depressions part way through, separated by a thin wall of metal, flattening the rod on one side of the enlargement, trimming it to a substantially rectangular shape with a notch in one edge, and punching a hole through the rectangular portion, providing a slit from the hole to the notched edge, and then punching the thin wall of metal from the center of said enlargement and at the same time cutting out a portion of the circumference of the enlargement to provide an open-sided bearing.

4. The method of making a presser for a flier, which consists in providing a rod, upsetting it at a point between its ends to form an enlargement, punching into the opposite sides of the enlargement to form depressions part way through, separated by a thin wall of metal, flattening the rod on one side of the enlargement, trimming it to the desired shape, then pressing it in dies to form a V-shaped slanting groove on one side, then trimming it again to provide a substantially rectangular shape with a notch in one edge, punching a hole through the rectangular portion at a point at the base of the V-shaped projection, and providing a slit from the hole to the notched edge and forming an open-sided bearing at the enlargement.

5. The method of making the eye end of a presser for a flier, which consists in providing a rod of uniform diameter, flattening the rod at one end, trimming it to the desired shape, pressing it in dies to form a V-shaped slanting groove on one side, trimming it to the desired shape, pressing it in dies to form a V-shaped slanting projection on the other side, trimming it again to provide a substantially rectangular shape with a notch in one edge, punching a hole through the rectangular portion at a point at the base of the V-shaped groove, and providing a slit from the hole to the notched edge.

6. The method of making a presser for the purpose described, which consists in upsetting a rod-like blank and shaping it to form a circular enlargement with opposite flat sides, forming depressions in said flat sides to leave a thin wall between them, flattening the blank on one side of the enlargement and cutting it to the desired shape, punching through said blank to form a circular perforation and a slot from the perforation to the edge, bending the rod at right angles to the part just described, the bend appearing at a point just beyond the circular enlargement, punching out the circular enlargement to form a hole through the thin wall therein and a slot through its side, bending the arm between the circular enlargement and the end of the rod shaped up as set forth to give it the desired curvature, bending the end of the rod at the other side of the enlargement at right angles, flattening the right-angle extension, trimming it and cutting it to a rectangular shape with a rectangular notch located centrally in the outer edge, then bending the rectangular portion in the form of a partial circle open at one side to form an upper bearing for a complete presser in one piece.

In testimony whereof I have hereunto affixed my signature.

HJALMAR G. CARLSON.